United States Patent [19]
Kawabuchi et al.

[11] Patent Number: 4,462,092
[45] Date of Patent: Jul. 24, 1984

[54] ARC SCAN ULTRASONIC TRANSDUCER ARRAY

[75] Inventors: Masami Kawabuchi, Yokohama; Junichi Satoh, Isehara; Fumio Muramatsu; Koetsu Saitoh, both of Kawasaki, all of Japan

[73] Assignee: Matsushita Electric Industrial Company, Limited, Osaka, Japan

[21] Appl. No.: 263,739

[22] Filed: May 14, 1981

[30] Foreign Application Priority Data

May 15, 1980 [JP] Japan .................................. 55-64789

[51] Int. Cl.³ ...................... G01S 15/89; H01L 41/10
[52] U.S. Cl. .................................... 367/105; 73/626; 310/336; 128/660
[58] Field of Search ............... 367/103, 105, 152, 153; 310/322, 336, 348; 73/626, 644; 128/661, 660

[56] References Cited

U.S. PATENT DOCUMENTS

| | | | |
|---|---|---|---|
| 4,101,795 | 7/1978 | Fukumoto et al. | 367/152 X |
| 4,152,678 | 5/1979 | Schott et al. | 367/103 X |
| 4,211,948 | 7/1980 | Smith et al. | 367/152 X |
| 4,224,829 | 9/1980 | Kawabuchi et al. | 73/626 |
| 4,281,550 | 8/1981 | Erikson | 73/626 |
| 4,344,327 | 8/1982 | Yoshikawa et al. | 73/626 |

FOREIGN PATENT DOCUMENTS

2412080  8/1979  France ................................ 367/105

Primary Examiner—Richard A. Farley
Attorney, Agent, or Firm—Lowe, King, Price & Becker

[57] ABSTRACT

A plurality of transducers is arranged successively on a common impedance matching layer of a resilient material. Each transducer comprises an elongated piezoelectric element having a width expansion vibrational mode, a pair of first and second electrodes attached to opposite surfaces of the element across its thickness and an elongated block of an impedance matching material disposed between the second electrode and the common impedance matching layer. The common impedance matching layer is bent to take the shape of an arch to conform to the surface of a frame structure which is convexed in the direction of propagation of ultrasonic energy. The piezoelectric elements are secured to the frame so that they bridge the parallel side members of the frame. The piezoelectric members are divided into a plurality of subgroups, each composed of successively arranged elements. The piezoelectric elements of a given subgroup are selected and energized during each clock interval for transmission of focused ultrasonic energy. The subgroup to be selected is shifted linearly to the next by at least one element in response to successive clock pulses. Becuase of the convex shape of the array, the transmitted energy is successively angulated to provide arc scan.

9 Claims, 7 Drawing Figures

ARC SCAN ULTRASONIC TRANSDUCER ARRAY

BACKGROUND OF THE INVENTION

The present invention relates to a piezoelectric transducer array for use in an ultrasonic imaging system particularly for medical applications and to an ultrasonic imaging system of an arc scan type incoporating the array.

Ultrasonic transducer arrays are currently classified under the categories of linear scan type, sector scan type and arc scan type. Conventional transducer arrays used in the arc scan type comprise an elongated piezoelectric member of a ceramic material which is formed into the shape of an arch, a plurality of electrodes arranged on one surface of the piezoelectric member, and a common electrode attached to the other surface of the piezoelectric member. The common electrode is covered by an insulative layer such as silicon rubber or the like, while the individual electrodes are covered by a layer of ferrite rubber or epoxy resin mixed with tungsten powder for purposes of damping vibrations of the piezoelectric member and adding a structual integrity thereto. The insulative layer defines a surface that is convex in the direction of propagation of ultrasonic energy to serve as a contact face with a human subject. Conventional methods for forming such a curved piezoelectric member involve deforming the piezoelectric ceramic body into the shape of an arch and then baking the arched body at an elevated temperature, or grinding the ceramic body into the shape of an arch. By comparison with a flat-type transducer array wherein no forming process is involved, the conventional convex type transducer array is disadvantageous in terms of yield. Furthermore, since the individual electrodes define with the common electrode plural regions of an electrically energized state to generate ultrasonic energy from such regions, adjacent regions tend to interfere with each other producing an abnormal sidelobe which causes the array to deviate in operating performance from the intended design parameters. Since the vibrational mode of the conventional array is of a thickness mode, the electromechanical coefficient $k_t$ is less than 0.5, a value insufficient to provide satisfactory sensitivity and frequency bandwidth characteristics.

SUMMARY OF THE INVENTION

According to the present invention, the transducer array comprises an impedance matching layer of a resilient material and a plurality of transducers arranged successively on the matching layer. Each of the transducers comprises an elongated piezoelectric element having a width to thickness ratio of approximately 0.6 to cause the piezoelectric element to vibrate in a width expansion mode. A pair of electrodes is attached to opposite surfaces of the piezoelectric element across its thickness. Each transducer further includes an elongated block of an impedance matching material such as rock crystal, glass or fused quartz. Because of the resiliency of the material, the common layer permits the array to take a desired shape so that it is fitted into a framed structure having a surface that is convex in the direction of propagation of ultrasonic energy. The piezoelectric elements are secured to the frame so that they bridge the parallel side members of the frame to cause vibration in a width expansion rode which coincides to the longitudinal direction of the array.

Since the transducers are mounted on individual impedance matching elements through which acoustic energy is transmitted to the underlying common resilient layer, undesirable acoustic interference is eliminated. The width expansion mode results in excellent performance in sensitivity to applied voltage and in frequency response.

An object of the invention is therefore to provide an ultrasonic transducer array having a convex surface wherein the prior art problems are eliminated.

According to another aspect of the invention, the curved array is incorporated advantageously in an arc scan type ultrasonic imaging system. In the ultrasonic imaging system, the piezoelectric elements are divided into a plurality of subgroups of piezoelectric elements. Transmitter channels are connected to the piezoelectric elements of a selected subgroup which is shifted by a switching circuit in response to a clock pulse to the next adjacent subgroup spaced apart by at least one piezoelectric element. Signals on the transmitter channels are delayed by a focusing circuit to cause the transmitted acoustic energy to focus at a desired depth from the entry point of the energy. Because of the convex shape of the array, the focused ultrasonic energy is steered in an arc format. An arc steering circuit, which is usually complex and costly, is therefore eliminated in the present invention.

BRIEF DESCRIPTION OF THE DRAWINGS

The invention will be further described with reference to the accompanying drawings, in which.

DETAILED DESCRIPTION

Figure 1:
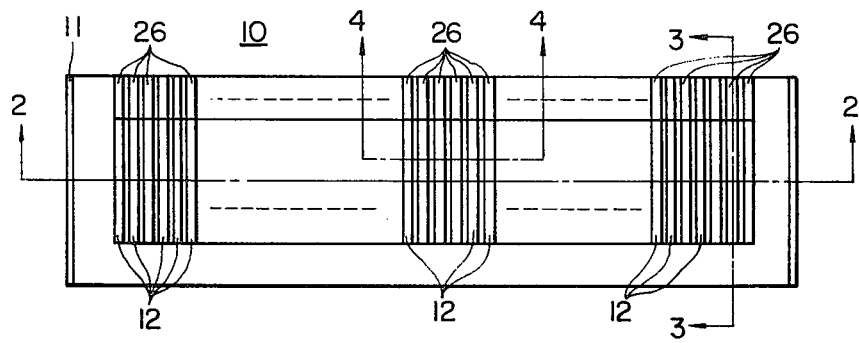
FIG. 1 is an illustration of a top plan view of an ultrasonic transducer array of the invention.
Figure 2:
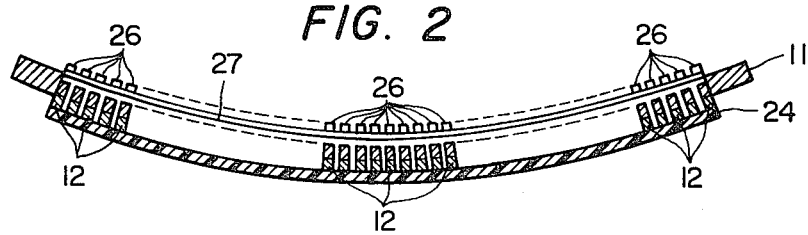
FIG. 2 is an illustration of a cross-sectional view taken along the lines 2—2 of FIG. 1.
Figure 3:
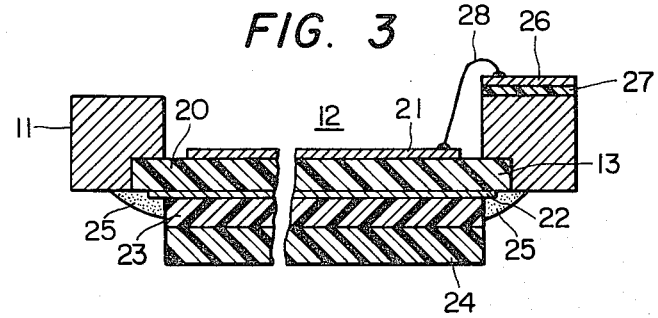
FIG. 3 is an illustration of a cross-sectional view taken along the lines 3—3 of FIG. 1.
Figure 4:
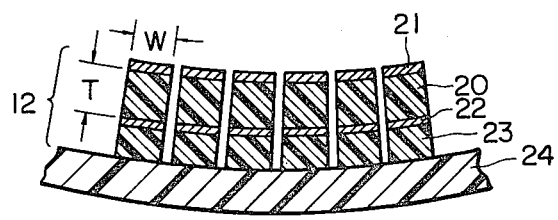
FIG. 4 is an illustration of a cross-sectional view taken along the lines 4—4 of FIG. 1.

An array of piezoelectric transducers embodying the invention is generally indicated at 10 in FIG. 1. The transducer array 10 comprises a conductive frame 11 which is convex in the direction of propagation of ultrasonic energy and a plurality of elongated piezoelectric transducers 12 successively arranged on the convex frame structure 11 as seen from FIG. 2. As illustrated in FIGS. 3 and 4, each transducer comprises a piezoelectric element 20 which bridges the parallel side members of the frame 11. Each piezoelectric element comprises a two-component ceramic of lead titanate and lead zirconate (known under Trademark PZT) or a three-component system of lead titanate, lead zirconate and lead magnesium niobate (known under Trademark PCM) having a width (W) to thickness (T) ratio (=W/T) of about 0.6. This width-to-thickness ratio gives the piezoelectric element a width expansion mode of vibration with an electromechanical coupling coefficient $k_e$ of 0.65 to 0.7, a value significantly higher than the coefficient $k_t$ which provides a thickness expansion mode of the conventional transducer element. High sensitivity and excellent bandwidth characteristics are this obtained. On the upper and lower sides of the piezoelectric element 20 are individual electrodes 21 and 22. The piezoelectric element 20 is secured to a recessed portion 13 of the frame 11 by a suitable adhesive material. On the lower side of the electrode 22 is a first impedance matching material in the form of an elongated body 23 which forms part of each transducer 12. The transducer elements 12 are secured to a common layer or second impedance matching material in the form of a common layer 24 and takes the shape of an arch to define a contact surface with which the array 10 is brought to contact with the surface of a human subject. The lower electrodes 22 of all the transducer elements 12 are brought into contact with the frame 11 by conductive adhesive 25 so that the frame 11 serves as a common electrode for the transducer elements, while the upper electrodes 21 of the transducers are connected by leads 28 to individual electrodes 26 provided on a layer 27 of an insulative material which is formed on the upper surface of one edge of frame 11. The first impedance matching body 23 is formed of rock crystal, glass or fused quartz and the second impedance matching layer 24 is formed of epoxy resin.

The transducer array of the invention is manufactured advantageously as follows. A piezoelectric layer with a metal coating on opposite faces is cemented to a layer of the first impedance matching material just referred to above by an adhesive material. The first impedance matching layer is adhesively cemented to the second impedance matching layer 24. Subsequently, this assembly is subjected to a dicing process with which the upper two layers is cut to produce a plurality of transducer elements 12 which remain secured to the second impedance matching layer 24. Because of the resiliency of the second impedance matching layer 24, the assembly can lend itself to adaptation to a curved configuration. The common impedance matching layer 24 is bent to take the shape of an arch to conform to the convex conductive frame 11 and the individual piezoelectric elements 20 are then cemented to the side members of the frame 11. The above manufacturing process allows transducer arrays to be manufactured with precision and efficiency, and eliminates the time-consuming process associated with the prior art transducer array.

Figure 5:
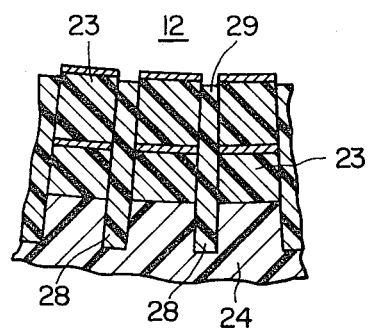
FIG. 5 is an illustration of a modified embodiment of the invention.

The acoustic impedance of the blocks 23 is 2.5 to 9.5 times greater than the acoustic impedance of the human body through which the acoustic wave propagates, while the acoustic impedance of underlying layer 24 is 1.6 to 2.7 times greater than that of the human body. Since the piezoelectric elements 20 are individually secured to the impedance matching blocks 23, they are acoustically isolated from each other. The acoustic isolation can be further increased by forming grooves or cuts 28 on the surface of the second matching layer 24 along paths between adjacent transducer elements 12 as shown in FIG. 5. The grooves 28 can advantageously be formed simultaneously with the dicing process. Although air is an excellent material for acoustic isolation between transducer elements 12, the space between adjacent elements 12 may be filled in by a material 29 to add rigidity to the array 10 as shown in FIG. 5. Appropriate material for this purpose is epoxy resin, silicon or the like since it produces no adverse effect on the vibration mode of the elements and does not significantly degrades the acoustic isolation. The convex transducer array 10 as described above is advantageously employed in an ultrasonic imaging system generally indicated at 30 in FIG. 6. In this embodiment, a set of three transducer arrays 10a, 10b and 10c is placed in contact with a human body 60 and shown connected to a switching circuit 40 which couples signals from a transmitter-receiver unit 50 to a selected subgroup of successively arranged transducers. The transmitter includes a focusing circuit which successively delays a burst signal. The successively delayed signals are supplied to the transducers of the selected subgroup to transmit a focused ultrasonic beam. The switching circuit 40 successively shifts the selected subgroup to the next by at least one transducer element. Because of the convex surface of the arrays, the successive shifting of the subgroup of transducers causes the transmitted ultrasonic energy to be angulated as indicated by broken lines.

Figure 6:
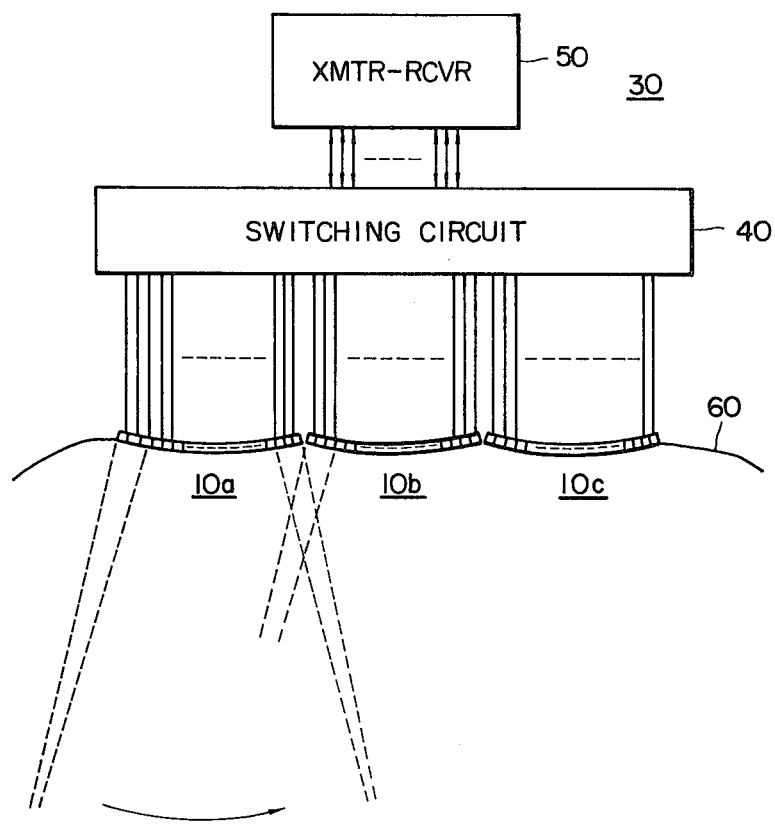
FIG. 6 is a schematic illustration of an ultrasonic imaging system of an arc scan type incorporating the transducer array of the invention.
Figure 7:
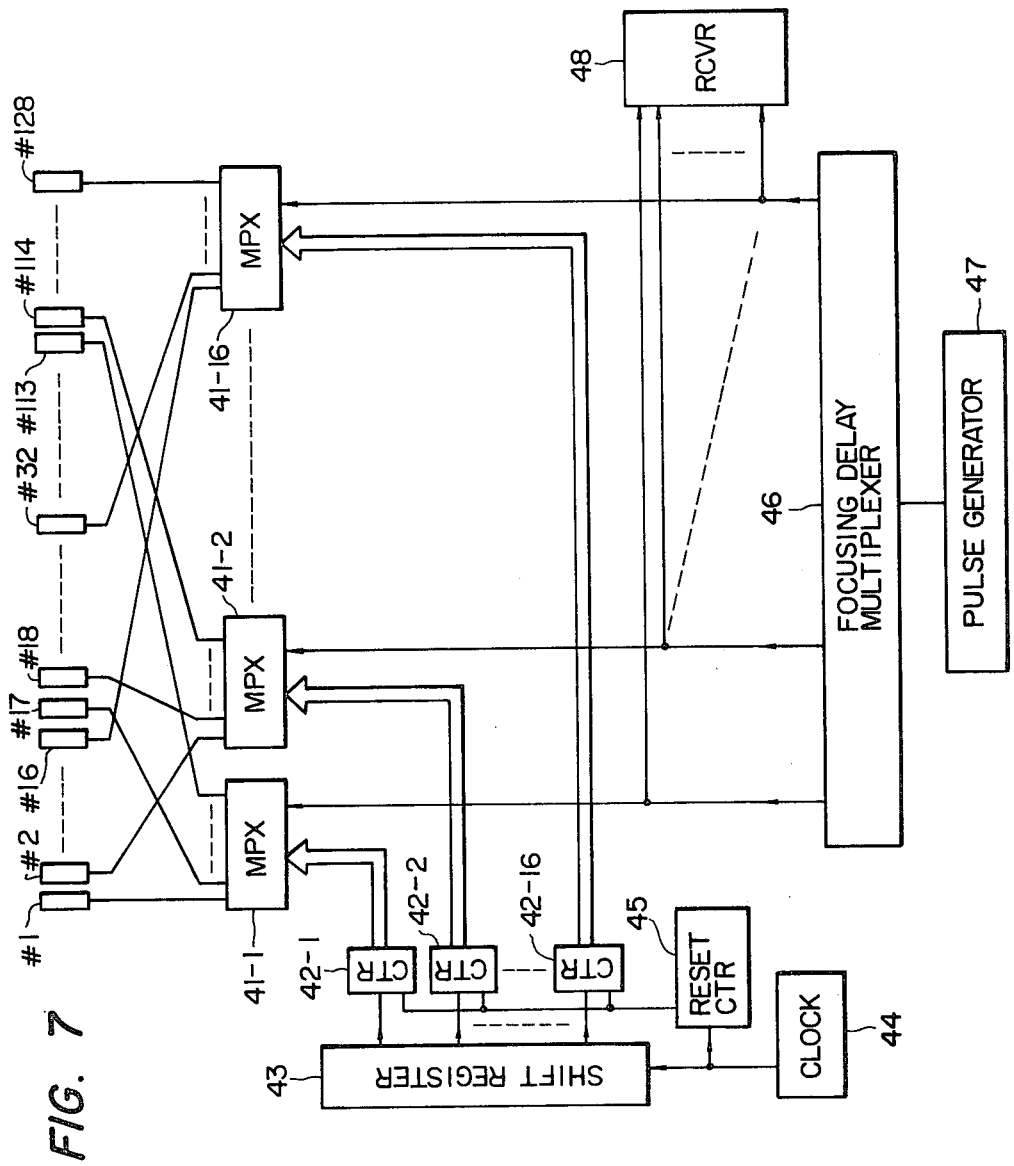
FIG. 7 is an illustration of the detail of the control circuit of FIG. 6.

Details of the control circuit of FIG. 6 are illustrated in FIG. 7. A plurality of analog multiplexers 41 is provided. For purposes of illustration multiplexers 41-1 through 41-16 are provided for a set of 128 piezoelectric elements indicated at #1 through #128. The piezoelectric elements are divided into 16 subgroups of 8 transducers each. Each analog multiplexer 41 is provided with 8 output terminals. The corresponding output terminals of the multiplexers 41-1 to 41-16 are respectively connected to adjacent transducer elements. For example, the #1 output terminals of multiplexers 41-1 to 41-16 are connected to respectively to the #1 to #16 transducers, the #2 output terminals are connected respectively to the #17 to #32 transducers, and the #16 output terminals are connected respectively to the #113 to #128 transducers. A plurality of counters 42-1 to 42-16 is provided corresponding to the multiplexers 41-1 to 41-16, respectively. Each counter 42 is provided with three output terminals which are connected to the corresponding multiplexer to select one of its 8 output terminals in response to receipt of an input pulse supplied from the corresponding output terminal of a shift register 43. The shift register 43 takes its input signal from a clock source 44, so that counters 42-1 to 42-16 are counted up in response to every 16th clock pulse, and cleared by a reset counter 45 in response to every 128th clock pulse. In response to the #1 clock pulse all the counters 42 are set for selecting the #1 output terminals of the multiplexer 42-1 to 42-16, so that the #1 to #16 transducers are selected. This condition is retained until the #2 clock pulse appears whereupon the counter 42-1 is counted up to cause the multiplexer 41-1 to select its #2 output terminal. The #2 to #17 transducers are thus selected during this clock interval until the #3 clock pulse appears. Therefore, a subgroup of 16 successive transducers is successively selected and shifted to the next by one transducer in response to each clock pulse.

The selected transducers are energized by a burst signal which is supplied to the input terminal of each multiplexer. The burst signal applied to each multiplexer is derived from a focusing delay multiplexer 46 which essentially comprises a plurality of delay elements. The delay elements are connected to a pulse generator 47 to produce successively delayed pulses to focus the acoustic energy transmitted by the transducers of selected subgroup. The intervals between successively delayed pulses are determined so as to compensate for the convex shape of the surface of the array which tends to diverge the transmitted acoustic energy. The delayed pulses from the focusing delay multiplexer 46 occur during the initial period of each clock interval to allow the transducers of the selected subgroup to receive echos returning from the inside of the human subject. The received echo signals are passed to a receiver 48 which converts the echo signals in a manner inverse to that of the transmitter to provide display on a display unit, not shown.

We claim:

1. An ultrasonic transducer array comprising:
   a curved support having a pair of bridged parallel members convex in the direction of propagation of acoustic energy;
   a plurality of successively arranged elongated transducers each comprising a piezoelectric electric element having a width expansion vibrational characteristic supported between said bridged parallel members, and a pair of first and second electrodes attached to the opposite sides and across the thickness thereof for connection to a transducer control circuit to generate said acoustic energy;
   an impedance matching layer of a resilient material presenting a convex surface for radiating said acoustic energy; and
   a plurality of impedance matching elements corresponding to said transducers and secured between the corresponding transducers and said impedance matching layer to reduce acoustic interference between adjacent transducers and having a higher acoustic impedance than the acoustic impedance of said impedance matching layer to form a double-layered impedance matching structure with said layer to provide impedance matching between a human body and said transducers.

2. An ultrasonic transducer array as set forth in claim 1, wherein said impedance matching layer is formed of a synthetic resin.

3. An ultrasonic transducer array as set forth in claim 1, wherein each said piezoelectric element has a width-to-thickness ratio of substantially 0.6:1.

4. An ultrasonic transducer array as set forth in claim 1, wherein said impedance matching layer is formed with a plurality of grooves each extending parallel between adjacent ones of said transducers.

5. An ultrasonic transducer array as set forth in claim 1 or 4, further comprising a resilient material provided between adjacent ones of said transducers.

6. An ultrasonic transducer array as set forth in claim 5, wherein each material comprises a synthetic resin.

7. An ultrasonic transducer array as set forth in claim 1 or 2, wherein said impedance matching layer comprises rock crystal, glass or fused quartz.

8. An ultrasonic transducer array as set forth in claim 1, wherein the acoustic impedance of said impedance matching elements is substantially 2.5 to 9.5 times greater than the acoustic impedance of the human body, and the acoustic impedance of said impedance matching layer is substantially 1.6 to 2.7 times greater than the acoustic impedance of the human body.

9. An ultrasonic imaging system comprising:
   a curved transducer array including a curved support having a pair of bridged parallel members convex in the direction of propagation of acoustic energy, a plurality of successively arranged elongated transducers, each comprising a piezoelectric element having a width expansion vibrational characteristic supported between said bridged parallel members, and a pair of first and second electrodes attached to the opposite sides and across the thickness thereof for connection to a transducer control circuit to generate said acoustic energy, an impedance matching layer of a resilient material presenting a convex surface for radiating said acoustic energy, and a plurality of impedance matching elements corresponding to said transducers and secured between the corresponding transducers and said impedance matching layer to reduce acoustic interference between adjacent transducers and having a higher acoustic impedance than the acoustic impedance of said impedance matching layer to form double-layered impedance matching structure with said layer to provide impedance matching between a human body and said transducers;
   first means for generating clock pulses;
   second means including a group of transmitter channels for generating in said channels burst signals at different delay times within an interval between successive clock pulses for focusing said acoustic energy; and
   third means for coupling said transmitter channels to a selected subgroup of successively arranged transducers and successively shifting said subgroup to the next by at least one transducer in response to each of said clock pulses for steering the focused energy.

* * * * *